Feb. 5, 1946.  A. J. McCONNELL  2,394,089
PROTECTIVE SYSTEM
Filed Feb. 10, 1944
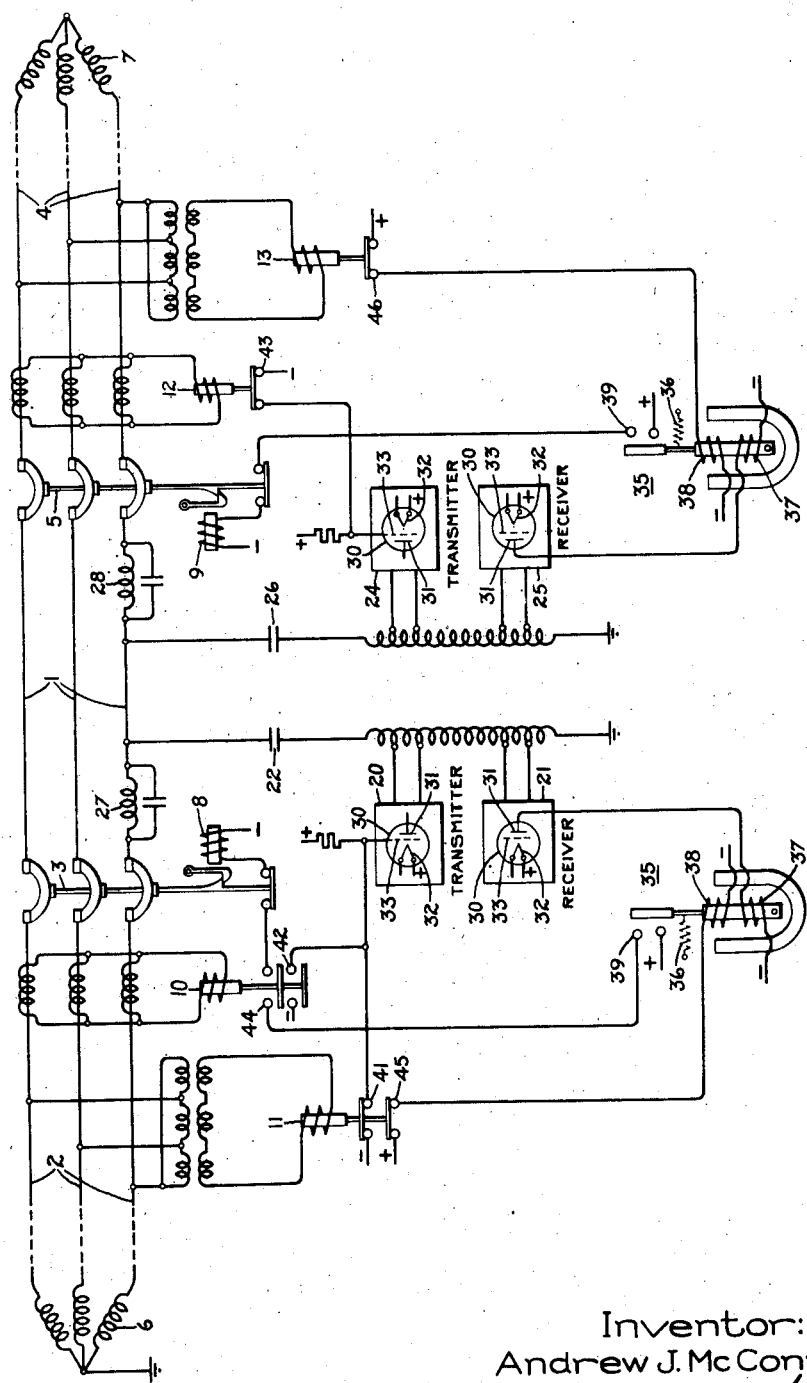
Inventor:
Andrew J. McConnell,
by Harry E. Dunham
His Attorney.

Patented Feb. 5, 1946

2,394,089

UNITED STATES PATENT OFFICE 2,394,089

PROTECTIVE SYSTEM

Andrew J. McConnell, Albany, N. Y., assignor to General Electric Company, a corporation of New York Application February 10, 1944, Serial No. 521,803

10 Claims. (Cl. 175—294)

My invention relates to protective systems and particularly to a system for protecting an electric circuit against ground faults.

When a ground fault occurs on an electric circuit interconnecting a grounded source and an ungrounded source, no zero phase sequence current flows in the circuit between the ground fault and the ungrounded source. Therefore, any ground fault responsive device which depends upon the flow of ground fault current cannot be used to effect the opening of a circuit interrupter located between the ground fault and the ungrounded source. Heretofore, it has been necessary to provide some form of back-up protection to effect the opening of such a circuit interrupter after the ground fault has been disconnected from the grounded source. In many cases, however, the ground fault should be disconnected from the ungrounded source as soon as possible, namely, at the same time the ground fault is disconnected from the grounded source, because certain types of ground faults, such as arcing grounds, subject the ungrounded system to excessive overvoltages which may in turn cause other faults.

One object of my invention is to provide a ground fault protective equipment which will effect the simultaneous opening of the circuit interrupters at both ends of an alternating current circuit in response to a ground fault on the circuit when the source connected to one end of the circuit is ungrounded.

Another object of my invention is to provide an improved ground fault protective equipment which will effect the disconnection of a section of an electric circuit, one end of which is ungrounded, in response to a ground fault only when the ground fault is on the protected section.

In accordance with my invention, I control the circuit interrupters at the ends of the protected section in response to the zero phase sequence voltages and currents at the respective ends so that the circuit interrupters at both ends of the section are simultaneously opened in response to a zero phase sequence current at the grounded source end of the protected section if, at the same time, there is a zero phase sequence voltage but no zero phase sequence current at the ungrounded source end of the protected section.

My invention will be better understood from the following description when taken in connection with the accompanying drawing, the single figure of which diagrammatically illustrates an embodiment of my invention in connection with a protective arrangement for a line section of a polyphase circuit, and the scope of my invention will be pointed out in the appended claims.

Referring to the drawing, 1 represents a line section of a three-phase electric power system, one end of the section being connected to another line section 2 by means of a suitable circuit interrupter 3 and the other end of the line section 1 being connected to another line section 4 by means of a suitable circuit interrupter 5. The line section 2 is shown as being supplied with current from a suitable grounded polyphase source 6 and the line section 4 is shown as being supplied with current from a suitable ungrounded polyphase source 7. The circuit interrupters 3 and 5 are shown as being of the well known latched-in type and as having trip coils 8 and 9 respectively which when energized effect the opening of the associated circuit interrupter.

For controlling the opening of the circuit interrupters 3 and 5 in response to a ground fault on the line section 1, I provide, at the grounded source end of section 1, a zero phase sequence current relay 10 which is connected to the polyphase circuit in any suitable manner, examples of which are well known in the art, so that it responds to a predetermined value of zero phase sequence current flowing through the circuit interrupter 3, and a zero phase sequence voltage relay 11 which is connected to the polyphase circuit in any suitable manner, examples of which are well known in the art, so that it responds to a predetermined value of zero phase sequence voltage at the grounded source end of the line section 1. At the ungrounded source end of the line section 1, I also provide a similar zero phase sequence current relay 12 which responds to a predetermined value of zero phase sequence current flowing through the circuit interrupter 5 and a similar zero phase sequence voltage relay 13 which responds to a predetermined zero phase sequence voltage at the ungrounded source end of the line section 1.

In general, the settings of the zero phase sequence current relays 10 and 12 are such that the relay 12 at the ungrounded end of the line section is more sensitive than the relay 10 at the grounded end so that a ground fault on the portion of the electric system between the circuit interrupter 5 and the source 7 will be sure to operate the relay 12 at the ungrounded end whenever the relay 10 at the grounded end is operated. Similarly, the settings of the zero phase voltage relays 11 and 13 are such that the relay 11 at the grounded end of the line section 1 is more sensitive than the relay 13 at the ungrounded end so that it will be sure to operate under any ground fault condition which causes the relay 13 to operate.

For effecting the simultaneous opening of the circuit interrupters 3 and 5, I have shown my invention in connection with a carrier current pilot relaying equipment of the well-known intermittent type, comprising a carrier current transmitter 20 and a carrier current receiver 21 which are connected between the ungrounded source end of one of the phase conductors of the line section 1 and ground by means of a suitable coupling capacitor 22, and a carrier current transmitter 24 and a carrier current receiver 25 which are connected between the ungrounded source end of the same phase conductor of the line section 1 and ground by means of a suitable coupling capacitor 26. Suitable wave traps 27 and 28 are provided in the line conductor of the line section 1 so as to confine the carrier current within the line section 1. While I have shown the pilot channel as being one of the phase conductors, it is obvious that it could be any other type of channel through which an electric signal can be transmitted.

Each of the carrier current transmitters and receivers is shown as including an electric discharge valve 30 having an anode 31, a cathode 32, and a grid or control electrode 33. Under normal operating conditions of the system, the grid 33 of the valve 30 of each of the transmitters is maintained at the proper potential relative to the potential of the associated cathode 32 so that the associated transmitter is inoperative. As shown, this result is accomplished by connecting the grid and cathode of each tube to a common source of direct current so that the potential normally applied to the grid is negative relative to the cathode potential. When, however, it is desired to transmit a signal over the pilot channel, the grid potential of one of the transmitters is changed to such a value relative to the associated cathode potential as to render the transmitter operative.

The transmitters 20 and 24 and the receivers 21 and 25 are tuned to the same frequency. Therefore, when either the transmitter 20 or the transmitter 24 is in operation, both of the receivers 21 and 25 are controlled in a manner well known in the art so that a current flows through the anode circuit of each of these receivers. This anode current flows through a winding of an associated receiver relay 35 so as to maintain the contacts thereof open. While the receiver relays 35 may be of any suitable type, I have illustrated them as being of the polarized type having an armature which is biased toward the contact closed position by a spring 36 and as having two holding windings 37 and 38, each of which when energized maintains the associated armature in its contact open position against the bias of the spring 36. The holding winding 37 is shown as being connected in the anode circuit of the associated carrier current receiver, and the other holding winding 38 is normally energized through a normally closed contact of the associated zero phase sequence voltage or current relay or both. In the particular arrangement shown in the drawing the energizing circuit of each holding winding 38 is controlled by the associated zero phase sequence voltage relay, but it will be obvious that holding winding 38 of the receiver relay 35 at the grounded source end of the line section 1 could be controlled by the zero phase sequence current relay 10.

Therefore, whenever there is a zero phase sequence voltage of a predetermined value present at the associated end of the line section 1, the receiver relay 35 at that end closes its contacts 39 unless a signal current is then being transmitted over the pilot channel. The contacts 39 of the receiver relay 35 at the grounded source end of the line section 1 are connected in an energizing circuit for the trip coil 8 of the circuit interrupter 3, and the contacts 39 of the receiver relay 35 at the ungrounded source end of the line section 1 are connected in an energizing circuit for the trip coil 9 of the circuit interrupter 5.

In order to effect the opening of the circuit interrupters 3 and 5 in response to a ground fault on the line section 1 and to prevent the opening of these circuit interrupters in response to a ground fault on the system outside of the line section 1, I provide in accordance with my invention, an arrangement for effecting a sustained operation of the carrier current transmitter 20 in case there is a zero phase sequence voltage present at the grounded source end of the line section 1 but no zero phase sequence current flowing through the circuit interrupter 3 and a sustained operation of the carrier current transmitter 24 in case there is a flow of zero phase sequence current through the circuit interrupter 5. This result is accomplished in the arrangement shown by having the zero phase sequence voltage relay 11, when it opens its contacts 41, remove the normal blocking potential from the grid 33 of the tube 30 of the transmitter 20, by having the zero phase sequence current relay 10, when it closes its contacts 42, reapply a blocking potential to the grid 33 of the tube 30 of the carrier current transmitter 20, and by having the zero phase sequence current relay 12, when it opens its contacts 43, remove the normal blocking potential from the grid 33 of the discharge tube 30 of the carrier current transmitter 24. The zero phase sequence current relay 10 is also provided with contacts 44 which control the energizing circuit of the trip coil 8 so that the circuit interrupter 3 can be opened only when there is a flow of zero phase sequence current through it, and the zero phase sequence voltage relay 11 is also provided with contacts 45 which control the energizing circuit of the holding winding 38 of the associated receiver relay 35 so that it can close its contacts 39 only when there is a zero phase sequence voltage present at the grounded source end of the line section 1. The zero phase sequence voltage relay 13 is provided with contacts 46 which control the circuit of the holding winding 38 of the associated receiver relay 35 so that it can close its contacts 39 only when there is a zero phase sequence voltage present at the ungrounded end of the line section 1.

The operation of the arrangement shown in the drawing is as follows: Under normal operating conditions, when there is no ground fault on the system, the contacts 41 of the zero phase sequence voltage relay 11 maintain a blocking potential applied to the grid 33 of the tube 30 of the transmitter 20, and the contacts 43 of the zero phase sequence current relay 12 maintain a blocking potential applied to the grid 33 of the tube 30 of the transmitter 24 so that no carrier current is normally transmitted over the pilot channel. The contacts 39 of the receiver relay 35 at the grounded source end of the line section 1 are normally maintained open by the associated holding winding 38, the energizing circuit of which is maintained closed through the contacts 45 of the zero phase sequence voltage relay 11, and the contacts 39 of the receiver relay 35 at the ungrounded source end of the line section 1 are normally maintained open by the associated holding winding 38, the energizing circuit of which is maintained closed through the contacts 46 of the zero phase sequence voltage relay 13.

When a ground fault occurs on the line section 1, zero phase sequence current flows from the grounded source 6 through the circuit interrupter 3 at the grounded source end of the line section 1 to the ground fault so that the zero phase sequence current relay 10 closes its contacts 42 and 44. No zero phase sequence current, however, flows from the ungrounded source 7 to the ground fault so that the zero phase sequence current relay 12 at the ungrounded source end of the line section 1 does not open its contacts 43. The ground fault on line section 1, however, does produce a zero phase sequence voltage at both ends of the line section so that the zero phase sequence voltage relay 11 at the grounded source end of the line section opens its contacts 41 and 45 and the zero phase sequence voltage relay 13 at the ungrounded source end of the line section 1 opens its contacts 46.

At the grounded source end of section 1, the closing of the contacts 42 of relay 10 applies blocking potential to the grid 33 of the tube 30 of the carrier current transmitter 20 so that it cannot transmit any blocking current over the pilot channel and at the ungrounded source end of the line section 1 the contacts 43 of the zero phase sequence current relay 12 still applies blocking potential to the grid 33 of the tube 30 of the carrier current transmitter 24. Therefore, when a ground fault occurs on the line section 1, no carrier current is transmitted over the pilot channel to effect the energization of the holding windings 37 of the receiver relays 35. Consequently, the opening of the contacts 45 of the zero phase sequence relay 11 causes the receiver relay 35 at the grounded source end of the line section 1 to close its contacts 39 and complete through the contacts 44 of the zero phase sequence voltage relay 10 the energizing circuit of the trip coil 8 of the circuit interrupter 3 so that the line section 1 is disconnected from the line section 2 and the opening of the contacts 46 of the zero phase sequence relay 13 causes the receiver relay 35 at the ungrounded end of the line section 1 to close its contacts 39 and complete an energizing circuit for the trip coil 9 of the circuit interrupter 5 so that the line section 1 is disconnected from the line section 4.

When a ground fault occurs on the system between the grounded source 6 and the circuit interrupter 3, such for example as on the line section 2, no zero phase sequence current flows at either end of the line section 1. The ground fault, however, produces a zero phase sequence voltage at both ends of the line section 1 so that the zero phase sequence voltage relay 11 at the grounded source end of the line section opens its contacts 41 and 45 and the zero phase sequence voltage relay 13 at the ungrounded source end of the line section 1 opens its contacts 46. Although the opening of the contacts 45 of the relay 11 interrupts the energizing circuit of the holding winding 38 of the receiver relay 35 at the grounded source end of the line section 1 and the opening of the contacts 46 of the relay 13 interrupts the energizing circuit of the holding winding 38 of the receiver relay 35 at the ungrounded source end of the line section 1, both of these receiver relays still maintain their contacts 39 open since their respective holding windings 37 are energized in response to the carrier current transmitted over the pilot channel by the transmitter 20. Therefore, a ground fault on the system between the grounded source 6 and the circuit interrupter 3 does not effect the opening of either the circuit interrupter 3 or the circuit interrupter 5.

When a ground fault occurs on the system between the circuit interrupter 5 and the ungrounded source 7, such for example as on the line section 4, a zero phase sequence current flows from the grounded source 6 through the line section 1 to the ground fault so that there is a zero phase sequence current present at each end of the line section 1. Consequently, the relay 10 closes its contacts 42 and 44, and the relay 12 opens its contacts 43. A zero phase sequence voltage is also present at each end of the line section 1 so that the relay 11 opens its contacts 41 and 45 and the relay 13 opens its contacts 46. The closing of the contacts 42 of the relay 10 and the opening of the contacts 41 of the relay 11 at the grounded source end of the line section 1 maintains in the manner heretofore described in connection with a ground fault on the line section 1, in a blocking potential applied to the grid 33 of the tube 30 of the transmitter 20 so that it transmits no blocking current over the pilot channel and the opening of the contacts 45 of the relay 11 interrupts the energizing circuit of the holding winding 38 of the receiver relay 35 at the grounded source end of the line section 1. This receiver relay 35 as well as the receiver relay 35 at the ungrounded source end of the line section 1, however, are prevented from closing their respective contacts 39 and effecting the opening of the associated circuit interrupters 3 and 5 because the zero phase sequence current relay 12 by opening its contacts 43 removed the blocking potential from the grid 33 of the tube 30 of the transmitter 24. Transmitter 24 therefore transmits a blocking signal over the pilot channel so that the holding windings 37 of the two receiver relays 35 are energized to maintain the contacts 39 of these relays open. Therefore, a ground fault on the system between the circuit interrupter 5 and the ungrounded source 7 does not effect the opening of either the circuit interrupter 3 or the circuit interrupter 5.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States is:

1. A ground fault protective equipment for a section of a polyphase circuit which has one end normally connected to a grounded source and the other end connected to a portion of the circuit which is ungrounded, means responsive to the zero phase sequence current flowing from said grounded source into said section, means responsive to the zero phase sequence voltage at the ungrounded end of said section, and means including said zero phase sequence current and voltage responsive means for effecting the disconnection of said section from said circuit in response to a ground fault on said section.

2. A ground fault protective equipment for a section of a polyphase circuit which has one end normally connected to a grounded source and the other end connected to a portion of said circuit which is ungrounded, means responsive to the zero phase sequence current flowing from said grounded source into said section, means responsive to the zero phase sequence current flowing at the ungrounded end of said section, means responsive to the zero phase voltage at the ungrounded end of said section, and means jointly controlled by said zero phase sequence current and voltage responsive means for effecting the disconnection of said section from said circuit in response to the flow of zero phase sequence current at the grounded source end of said section when no zero phase sequence current flows at the ungrounded end but there is a zero phase sequence voltage at the ungrounded end.

3. A ground fault protective equipment for a section of a polyphase circuit which has one end normally connected to a grounded source and the other end connected to a portion of said circuit which is ungrounded, means responsive to a zero phase sequence current at the grounded source end of said section, means responsive to a zero phase sequence voltage at the ungrounded end of said circuit, means responsive to a zero phase sequence current flow at the ungrounded end of said circuit, and means jointly controlled by said zero phase sequence current and voltage responsive means for disconnecting said section from said circuit when a zero phase sequence current flow occurs only at the grounded end and a zero phase sequence voltage occurs at the ungrounded end of said section.

4. A ground fault protective equipment for a polyphase circuit, a circuit interrupter in said circuit, means responsive to a zero phase sequence voltage at a predetermined point on said circuit, means responsive to a zero phase sequence current at said predetermined point, means responsive to a zero phase sequence current at another predetermined point on said circuit, means jointly controlled by said zero phase sequence voltage and current responsive means for effecting the opening of said circuit interrupter when a zero phase sequence voltage occurs at said predetermined point and a zero phase sequence current occurs only at said other predetermined point.

5. A ground fault protective equipment for a section of a polyphase circuit which has one end connected to a grounded source and the other end connected to a portion of said circuit which is ungrounded, means responsive to a zero phase sequence current flowing from said grounded source into said section, means responsive to a zero phase sequence voltage at the ungrounded end of said section, means responsive to a zero phase sequence current at the ungrounded end of said section, and means jointly controlled by said zero phase sequence current and voltage responsive means for effecting the simultaneous disconnection of both ends of said section from said circuit when a zero phase sequence current flows from said grounded source into said section and a zero phase sequence voltage and no zero phase sequence current occur at the ungrounded end of said section.

6. A ground fault protective equipment for a section of a polyphase circuit which has one end connected to a grounded source and the other end connected to a portion of said circuit which is ungrounded, a signal current pilot channel, means responsive to a zero phase sequence voltage at the grounded source end of said section for effecting the transmission of a signal current over said channel, means responsive to a zero phase sequence current at the ungrounded end of said section for effecting the transmission of a signal current over said channel, means responsive to a zero phase sequence current at the grounded source end of said section for preventing the zero phase sequence voltage responsive means at the grounded source end of said circuit from effecting the transmission of signal current over said channel, means jointly responsive to a zero phase sequence current at the grounded source end and the absence of signal current over said channel for effecting the disconnection of said section from the grounded source, and means jointly responsive to a zero phase sequence voltage at the ungrounded end of said section and the absence of signal current over said channel for effecting the disconnection of said section from the ungrounded portion of said circuit.

7. In a ground fault protective equipment for a polyphase circuit, a signal current pilot channel, means responsive to a predetermined zero phase sequence voltage of said circuit for effecting the transmission of a signal current over said channel, and means responsive to a predetermined zero phase sequence current of said circuit for preventing said zero phase sequence voltage responsive means from effecting the transmission of signal current over said channel.

8. In a protective system for an alternating current circuit, a circuit interrupter in said circuit, means responsive to a predetermined zero phase sequence voltage of said circuit for effecting the opening of said circuit interrupter, and means responsive to a predetermined zero phase sequence current in said circuit for preventing said zero phase sequence voltage responsive means from effecting the opening of said circuit interrupter.

9. In a protective system for an alternating current circuit, a circuit interrupter in said circuit, means responsive to a predetermined function of the zero phase sequence voltage of said circuit for effecting the opening of said circuit interrupter, and means responsive to a predetermined function of the zero phase sequence current in said circuit for preventing said zero phase sequence voltage responsive means from effecting the opening of said circuit interrupter.

10. In a protective system for alternating current circuit, a circuit interrupter in said circuit, means responsive to a zero phase sequence voltage at a predetermined point on said circuit, means responsive to a zero phase sequence current at said predetermined point on said circuit, and means jointly controlled by said zero phase sequence voltage and current responsive means for effecting the opening of said circuit interrupter when a zero phase sequence voltage unaccompanied by a zero phase sequence current occurs at said predetermined point.

ANDREW J. McCONNELL.